(12) United States Patent
Bunke et al.

(10) Patent No.: US 8,900,648 B2
(45) Date of Patent: *Dec. 2, 2014

(54) SINGLE-SERVE COFFEE POD

(75) Inventors: Paul Ralph Bunke, Cincinnati, OH (US); Alisa Anne Bolinger, Harrison, OH (US); Jianjun Justin Li, West Chester, OH (US); Athula Ekanayake, Cincinnati, OH (US)

(73) Assignee: The Folger Coffee Company, Orrville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,055

(22) Filed: Jul. 10, 2012

(65) Prior Publication Data

US 2012/0276252 A1 Nov. 1, 2012

Related U.S. Application Data

(63) Continuation of application No. 12/906,410, filed on Oct. 18, 2010, now Pat. No. 8,225,712, which is a continuation of application No. 11/431,464, filed on May 10, 2006, now Pat. No. 7,815,955.

(60) Provisional application No. 60/752,249, filed on Dec. 19, 2005.

(51) Int. Cl.
| | | |
|---|---|---|
| B65B 29/02 | (2006.01) | |
| A47J 31/36 | (2006.01) | |
| A47J 31/46 | (2006.01) | |
| A23F 5/26 | (2006.01) | |

(52) U.S. Cl.
CPC ............. *A23F 5/262* (2013.01); *A47J 31/3623* (2013.01); *A47J 31/46* (2013.01)

USPC ............... 426/77; 426/82; 426/433; 426/431; 99/323; 99/295

(58) Field of Classification Search
CPC ............ B54D 85/8043; B54D 85/8046; A47J 31/407; A47J 31/0668; A47J 31/0673; A47J 31/3623; A47J 31/3628; B65B 29/02
USPC ................. 426/433, 431, 77, 82; 99/323, 295
See application file for complete search history.

(56) References Cited

U.S. PATENT DOCUMENTS

| | | | |
|---|---|---|---|
| 2,047,172 A | | 7/1936 | Coleman |
| 2,052,476 A | * | 8/1936 | Koch ............................ 426/433 |
| 2,950,375 A | | 8/1960 | Sullivan |
| 3,292,527 A | * | 12/1966 | Stasse ............................ 99/295 |

(Continued)

FOREIGN PATENT DOCUMENTS

| | | |
|---|---|---|
| DE | 003300287 | 7/1984 |
| GB | 2111377 | 7/1983 |
| JP | 3555068254 | 5/1980 |

*Primary Examiner* — Anthony Weier
(74) *Attorney, Agent, or Firm* — Calfee, Halter & Griswold LLP

(57) ABSTRACT

Processes for controlling strength of an extracted beverage including providing a pseudo packed bed of an extractable beverage material and contacting at least one liquid extraction stream with the pseudo packed bed of beverage material at a selected depth to obtain at least one zone of minimum extraction and at least one zone of maximum extraction. As the depth at which the liquid extraction stream is introduced into the packed bed increases, the zone of minimum extraction increases and the zone of maximum extraction decreases.

3 Claims, 11 Drawing Sheets

(56) References Cited

U.S. PATENT DOCUMENTS

| | | | |
|---|---|---|---|
| 3,343,478 A * | 9/1967 | Hausam | 99/283 |
| 3,640,726 A * | 2/1972 | Bolt et al. | 426/595 |
| 3,790,689 A | 2/1974 | Ptichon et al. | |
| 5,197,375 A | 3/1993 | Rosenbrock | |
| 5,242,702 A | 9/1993 | Fond | |
| 5,322,703 A * | 6/1994 | Jensen et al. | 426/595 |
| 5,398,596 A | 3/1995 | Fond | |
| 5,656,316 A | 8/1997 | Fond et al. | |
| 5,980,965 A | 11/1999 | Jefferson, Jr. et al. | |
| 6,231,907 B1 | 5/2001 | Kino et al. | |
| 6,231,909 B1 | 5/2001 | Levinson | |
| 6,319,537 B1 | 11/2001 | Cheng et al. | |
| 6,352,736 B2 | 3/2002 | Borland et al. | |
| 6,740,345 B2 * | 5/2004 | Cai | 426/77 |
| 7,591,218 B2 | 9/2009 | Bunn et al. | |
| 7,815,955 B2 | 10/2010 | Bunke et al. | |
| 8,225,712 B2 * | 7/2012 | Bunke et al. | 99/323 |

* cited by examiner

SINGLE-SERVE COFFEE POD

CROSS-REFERENCE TO RELATED APPLICATIONS

This application is a continuation of, and claims priority to U.S. Ser. No. 12/906,410, filed Oct. 18, 2010, now U.S. Pat. No. 8,225,712, entitled "DEVICE FOR CONTROLLING THE STRENGTH OF AN EXTRACTABLE BEVERAGE," which claims priority to, and any other benefit of U.S. patent application Ser. No. 11/431,464, filed on May 10, 2006, now U.S. Pat. No. 7,815,955, which issued on Oct. 19, 2010, entitled "PROCESSES FOR CONTROLLING THE STRENGTH OF AN EXTRACTABLE BEVERAGE," which claims priority to and any other benefit of U.S. Provisional Application No. 60/752,249, filed on Dec. 19, 2005, the entire disclosure of which are all hereby incorporated by reference herein.

FIELD OF THE INVENTION

Exemplary embodiments of the present invention generally relate to processes for controlling the strength of an extractable beverage.

BACKGROUND OF THE INVENTION

Today's coffee savvy consumers can be quite particular about the way they prefer their coffee. Whether it is a skinny latte or a double shot espresso, consumers know what they want and expect it to be available to them when they want it.

While driving to the corner coffee shop is certainly one way for consumers to get their coffee as they wish, we live in a fast-paced, convenience-oriented society that often doesn't allow for the time needed to drive to the coffee shop, only to have to wait in line to purchase the desired beverage. Moreover, coffee house beverages are often too pricey for the average consumer to indulge in on a regular basis. Thus, in an effort to save both time and money, many consumers opt to prepare their coffee beverages at home.

Until recently, the only option available to consumers who wanted to brew their coffee at home was a conventional multi-cup brewing device. However, the recent development of single-cup brewing devices has opened up a new door for consumers wanting to brew only one cup of coffee at a time.

Single-cup brewing devices are designed to quickly brew a fresh cup of roast and ground coffee. Such systems allow the consumer to rapidly make an individual cup of coffee, rather than brewing an entire pot and wasting a portion of it if only a single cup is desired. Because of such features, many consumers prefer the ease and convenience of using one of the various single-cup brewing devices currently on the market. However, while single-cup brewing devices may offer the convenience consumers are looking for, such brewing devices can present unique challenges to consumer controlled brewing, and in particular, to the consumer's ability to control the strength of the coffee (e.g. strength control).

Strength control can be an important consideration for coffee drinkers. One reason many consumers drink coffee is because of the caffeine content, which can help them start their day awake and alert. However, individual consumers react to caffeine consumption in different ways. While one consumer may need a significant amount of caffeine (i.e. strong coffee beverage) to feel alert, another consumer may only need to consume a small amount of caffeine (i.e. mild coffee beverage) to experience the same effect, and indeed, may feel jittery and shaky if too much caffeine is consumed. In this respect, it is desirable to provide a way for consumers to control the strength of their coffee beverages.

Another reason many consumers drink coffee is because they enjoy the taste. However, some coffee drinkers have underlying health concerns, such as acid reflux or indigestion, which can restrict the strength of the coffee they can comfortably consume. Again, it is therefore desirable to give consumers the ability to control the strength of their coffee.

The aforementioned strength control challenges often associated with single-cup brewing devices largely relate to the fact that: single-cup brewing devices typically brew only prepackaged pods or cartridges containing a predetermined amount of coffee product. This packaging arrangement can prevent consumers from readily adjusting the strength of their coffee.

For instance, unlike standard multi-cup brewing devices, single-cup brewing devices use a predetermined amount of water to brew the beverages. Thus, if a consumer selects that he desires an 8 oz. cup of coffee, the single-cup brewing device is programmed to use roughly 8 oz. of water to extract and prepare the beverage. Thus, the consumer is not able to select a "mild" or "strong" 8 oz. cup of coffee. The consumer must accept the predetermined beverage strength programmed into the brewing devices, which is usually a moderate strength, and which may not be acceptable to all consumers.

Furthermore, as previously mentioned, most single-cup brewing devices currently on the market work in conjunction with pods or cartridges that contain a predetermined amount of extractable beverage material. Once again, there is little the consumer can do to alter the strength of the brewed beverage and must brew the predetermined amount of coffee present in the pod.

While these two factors are designed to make brewing a single cup of coffee easier and more convenient for the consumer, they can inadvertently make it more difficult for the consumer to brew a beverage having the strength he desires. Thus, to date, consumers who want the convenience of using a single-cup brewing device may have to sacrifice the ability to control the strength of their beverage.

Therefore, it is desirable to devise a process for producing a beverage that provides consumers with the ease and convenience of single-cup brewing without compromising the desired strength.

SUMMARY OF THE INVENTION

Exemplary embodiments of the present invention generally relate to processes for controlling the strength of an extractable beverage.

In particular, in one exemplary embodiment, the present invention generally relates to providing a pseudo packed bed of an extractable beverage material and contacting at least one liquid extraction stream with the pseudo packed bed of extractable beverage material at a selected depth to obtain at least one zone of minimum extraction and at least one zone of maximum extraction wherein as the depth at which the liquid extraction stream contacts the pseudo packed bed increases, the zone of minimum extraction increases and the zone of maximum extraction decreases.

In another exemplary embodiment, the present invention generally relates to providing a pseudo packed bed of an extractable beverage material and contacting at least one liquid extraction stream having a selected coverage area with the pseudo packed bed of beverage material to obtain at least one zone of minimum extraction and at least one zone of maximum extraction wherein as the coverage area of the liquid extraction stream increases, the zone of minimum extraction decreases and the zone of maximum extraction increases.

In still another exemplary embodiment, the present invention generally relates to providing a pseudo packed bed of an extractable beverage material and contacting at least one liquid extraction stream having a selected coverage area with the pseudo packed bed at a selected depth to obtain at least one zone of minimum extraction and at least one zone of maximum extraction wherein as the coverage area of the liquid extraction stream increases, the zone of minimum extraction decreases and the zone of maximum extraction increases and wherein as the depth at which the liquid extraction stream contacts the pseudo packed bed increases, the zone of minimum extraction increases and the zone of maximum extraction decreases.

DETAILED DESCRIPTION OF THE INVENTION

A. Definitions

Figure 1A:
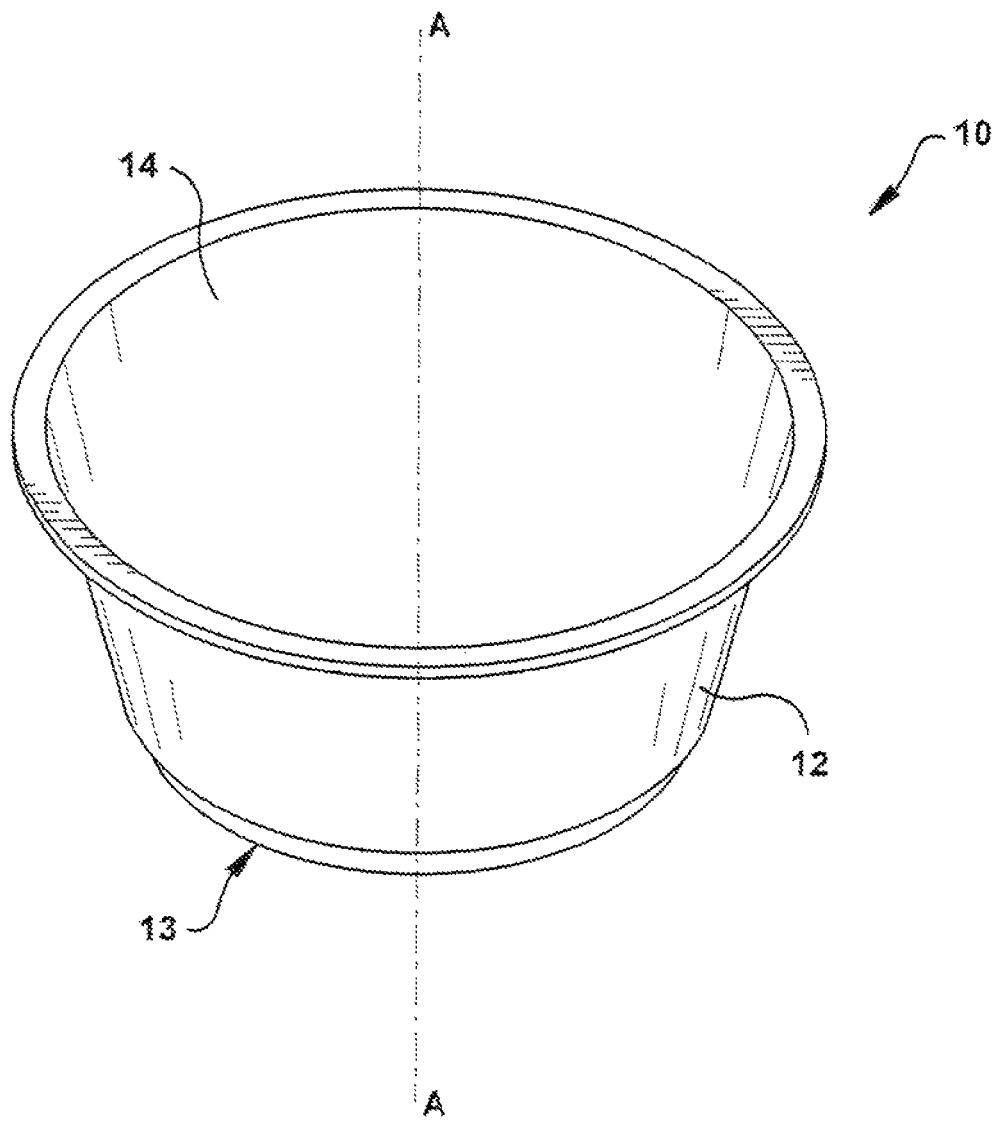
FIG. 1A is a schematic perspective view of one embodiment of an article for containing an extractable beverage material in accordance with exemplary embodiments of the present invention.

As used herein, the term "area" means internal space inside of an article that may be occupied by a pseudo packed bed of extractable beverage material. Area may be determined by the dimensions of the article. In addition to the pseudo packed bed, the area may also be occupied by a minimal void or headspace.

As used herein, the term "article[s]" means any package capable of containing a single serving of an extractable beverage material. Suitable articles for use herein, include, but are not limited to pods, cartridges and pouches, which may be flexible, rigid, semi-rigid, or combinations thereof and may be constructed of such materials as paper, non-woven filter materials, foils, plastics and combinations thereof.

As used herein, the term "at least one" means that while there can be only one, embodiments of the present invention need not be limited to such. For instance, there may be any number, such as two, three, four or more. For example, while there may be at least one liquid extraction stream, there may be two, three, four or any number of liquid extraction streams.

As used herein, the term "average" strength means the extracted beverage comprises from about 0.50% to about 0.75% brew solids, and in one embodiment about 0.60% brew solids, by weight of the extracted beverage. Additionally, an average strength extracted beverage can have a ratio of the zone of minimum extraction to the zone of maximum extraction of from about 0.20:1 to about 0.89:1, and in one embodiment about 0.5:1.

As used herein, the term "balanced" means that the beverage generally comprises about equal amounts of the early and late eluting components and does not contain substantially more of one component than the other. The flavor of the extracted beverage is of a high-quality typical of a fully-extracted coffee.

As used herein, the term "comprising" means various components can be cojointly employed in the methods and articles of this invention. Accordingly, the terms "consisting essentially of" and "consisting of" are embodied in the term comprising.

As used herein, the term "contact" means a liquid extraction stream is in fluid communication with the pseudo packed bed of extractable beverage materials such that extraction of the beverage materials occurs. Such contact can be direct (e.g. liquid extraction stream contacts the pseudo packed bed of extractable beverage material) or indirect (e.g. liquid extraction stream passes through article prior to contacting the pseudo packed bed of extractable beverage material).

As used herein, the term "coverage area" means a portion of the pseudo packed bed of extractable material within the article that can be contacted by at least one liquid extraction stream. The coverage area may take any form, including, but not limited to, a spray, fan or jet.

As used herein, the term "depth" means the distance into the pseudo packed bed at which the liquid extraction stream contacts the pseudo packed bed of extractable beverage material.

As used herein, the term "extractable beverage material(s)" means any material, and in one embodiment, plant material, which may be contacted with the liquid extraction stream to produce consumable beverage extracts. Suitable extractable beverage materials for use herein include, but are not limited to, roast and ground coffee and ground tea leaves. Such materials may be in the form of, but not limited to, dry particulates or powders.

As used herein, the term "extracted beverage(s)" or "extractable beverage(s)" means a consumable beverage resulting from contacting extractable beverage materials with a liquid extraction stream. Extracted beverages herein may include coffee beverages, tea beverages and the like.

As used herein, the term "fully extracted" means that substantially all of the water soluble solids of the extractable beverage material can be solubilized and removed in the targeted zone of maximum extraction leaving a mass of insoluble material in the article, when subjected to typical brewing conditions.

As used herein, the term "liquid extraction stream" means a fluid stream originating from a brewing device that can contact an article comprising an extractable beverage material to produce an extracted beverage. Though in one embodiment there is at least one liquid extraction stream, it will be understood that there may be any number. Moreover, any conventional brewing device liquid delivery mechanism may be used to distribute the liquid extraction stream such that it may contact the article, and more particularly, the substantially packed bed of extractable material. For instance, a nozzle or showerhead may be used to spray the liquid extraction stream onto the article to contact the extractable beverage material or, optionally, a piercing member may be used to introduce the liquid extraction stream into the article where it may contact the extractable beverage material.

As used herein, the term "mild" strength means the extracted beverage comprises less than about 0.50% brew solids, and in one embodiment from about 0.35% to about 0.49% brew solids, and in another embodiment about 0.40% brew solids, by weight of the extracted beverage. Additionally, a mild strength extracted beverage can have a ratio of the zone of minimum extraction to the zone of maximum extraction of from about 0.90:1 to about 2.3:1, and in one embodiment about 1.2:1.

As used herein, the term "overall strength" means the strength of the extracted beverage regardless of the number, depth and/or coverage area of the liquid extraction stream(s).

As used herein, the term "strong" strength means that the extracted beverage comprises at least about 0.76% to about 0.95% brew solids, in one embodiment about 0.80% brew solids, and in another embodiment about 0.85% brew solids, by weight of the extracted beverage. Additionally, a strong strength extracted beverage can have a ratio of the zone of minimum extraction to the zone of maximum extraction of from about 0.19:1 to about 0.01:1, and in one embodiment about 0.05:1.

As used herein, the terms "pseudo packed bed" and "pseudo packed bed environment" are used interchangeably to mean that extractable beverage material may be substantially fixed prior to contact with a liquid extraction stream, such that the extractable beverage material is significantly restricted in movement in all directions within the article. Under pseudo packed-bed conditions, free movement of the particles of the extractable beverage material may be reduced, such that particles located in the static zone(s) of minimum extraction may be hindered from entering into the dynamic zone(s) of maximum extraction. It is expected that particles within the maximum extraction zone can be in a state of flux due to the movement and velocity of the mobile phase, which further facilitates extraction. The size and/or area Of the pseudo packed bed can be defined by the dimensions of the article in which it is contained.

As used herein, the term "unextracted" refers to any portions of the extractable beverage material, and in particular to zones of minimum extraction, that may become wetted during the brew cycle due to capillary action, back-mixing, flooding or combinations thereof, but are not in constant contact with a liquid extraction stream, and thus, do not significantly contribute to the overall strength of the extracted beverage.

As used herein, the term "zone of maximum extraction" refers to an area of the pseudo packed bed of extractable materials wherein the extractable beverage materials may be fully extracted by constant contact with the at least one liquid extraction stream throughout the brew cycle.

As used herein, the term "zone of minimum extraction" refers to an area of the pseudo packed bed in which the extractable beverage material therein is substantially unextracted. Zones of minimum extraction are generally further from the liquid extraction stream, and more static, than the zones of maximum extraction. Therefore, zones of minimum extraction are not constantly contacted by a liquid extraction stream throughout the brew cycle and do not do not significantly contribute to the overall strength of the extracted beverage.

It will be understood that when referring to the drawings, like numerals designate like parts throughout the various views.

B. Processes

Exemplary embodiments of the present invention generally relate to processes for controlling the strength of an extractable beverage. As aforementioned, today's consumers enjoy the ease and convenience of single-cup brewing devices, yet still desire the ability to customize beverage strength to meet their dietary and taste preferences. Embodiments disclosed herein can aid in satisfying these consumer needs by providing processes that can give the consumer the ability to alter the strength of a prepackaged extractable beverage.

Embodiments of the present processes are designed for use with extractable beverage materials. As defined herein, "extractable beverage material(s)" includes roast and ground coffee, ground tea leaves and other similar plant-based materials, which may be contacted with a liquid, such as water, to produce consumable extracts. Such materials may be in the form of but are not limited to, dry particulates and/or powders. In one embodiment, the extractable beverage material may have a particle size of from about 300 microns to about 500 microns while in another embodiment, the extractable beverage material may have a particle size of about 400 microns. Furthermore, as used herein, "extracted beverage(s)" means the consumable beverage resulting from contacting the extractable beverage materials with liquid and include coffee beverages, tea beverages and the like. While the following description will focus on roast and ground coffee and coffee beverages extracted with water, those skilled in the art will understand that this is for illustration purposes only and the present invention should not be limited thereto.

Figure 1B:
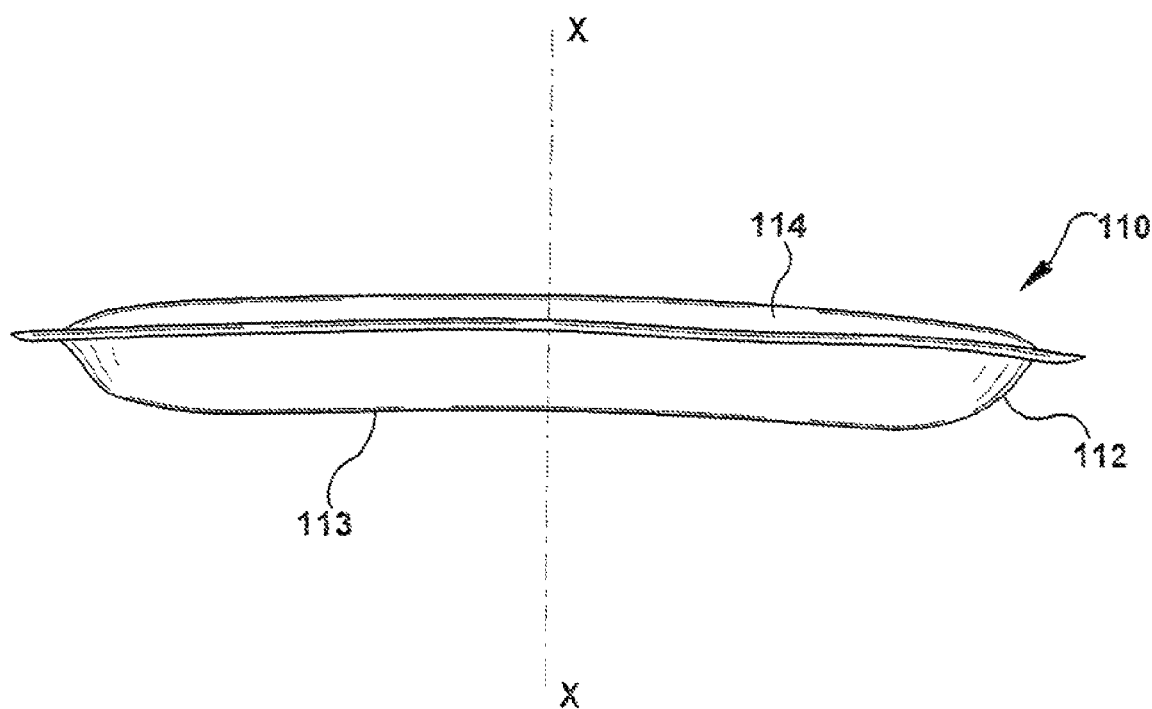
FIG. 1B is a schematic perspective view of an alternate embodiment of an article for containing an extractable beverage material in accordance with exemplary embodiments of the present invention.

Extractable beverage materials herein may be packaged in individual serving sized articles, such as, but not limited to, pods, cartridges or pouches for use in single-cup brewing devices. FIGS. 1A and 1B depict two exemplary embodiments of articles in accordance with the present invention. As shown in FIG. 1A, article 10 may generally comprise a body 12, a bottom 13 and a closure 14. Article 10, and more specifically, body 12, bottom 13 and closure 14, may be flexible or rigid and may be constructed of such materials as paper, non-woven filter materials, foils, and plastics, as well as combinations thereof. Additionally, the articles herein may come in a variety of configurations. For instance, in one embodiment, article 10 may be a deep cup-shaped container, like that shown in FIG. 1A, and may optionally comprise a water impermeable body 12 and water permeable bottom 13 and closure 14. Such a configuration may help to ensure proper extraction by directing a liquid through article 10 and out bottom 13 rather than out through body 12. In another embodiment, as shown in FIG. 1B, article 110 may be a substantially flat pouch in which body 112, bottom 113 and closure 114 may all be comprised of filter paper material. Regardless of which configuration is chosen, the articles herein can contain an individual serving of extractable beverage material for use in conjunction with single-cup brewing devices. Moreover, the articles may be designed such that the extractable beverage material can be retained and prevented from exiting the article along with the extracted beverage. This may be accomplished by using filter paper, or other like material, as the bottom of the article. Those skilled in the art will understand how to construct such articles to satisfy the previously described desirable features.

As discussed above, single-cup brewing devices can present unique challenges to consumer controlled brewing, and in particular, to strength control. Embodiments of the present processes can address these challenges by allowing the consumer to control one or more aspects of the brewing process, thereby controlling the strength of the beverage.

In conventional brewing processes, the coffee grounds used to brew coffee can be loose or loosely packed to allow a maximum area of the coffee particles to come into contact with water during the extraction process. This can help ensure that the extract produced during brewing is rich in extractable material, thereby providing a beverage having a balanced taste. The notion of loosely packing the particles may be especially true for the pods and cartridges used in single-cup brewing devices, which tend to have empty head space between the top of the coffee particles and the closure to allow the coffee particles to freely shift about. Because of the rapid brew cycle of single-cup brewing devices, it can be important that the maximum amount of extractable material is exposed to the extraction liquid in order to help ensure the finished beverage has the desired quality characteristics.

Figure 2A:
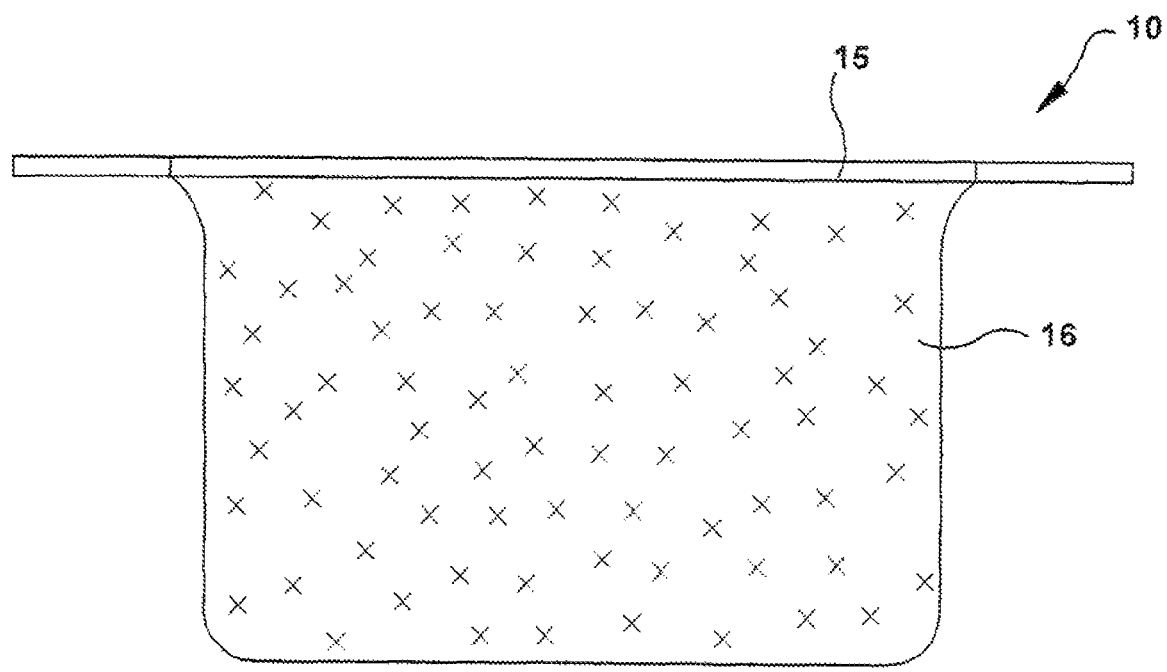
FIG. 2A is a schematic cross-sectional view FIG. 1A along line A-A.
Figure 2B:
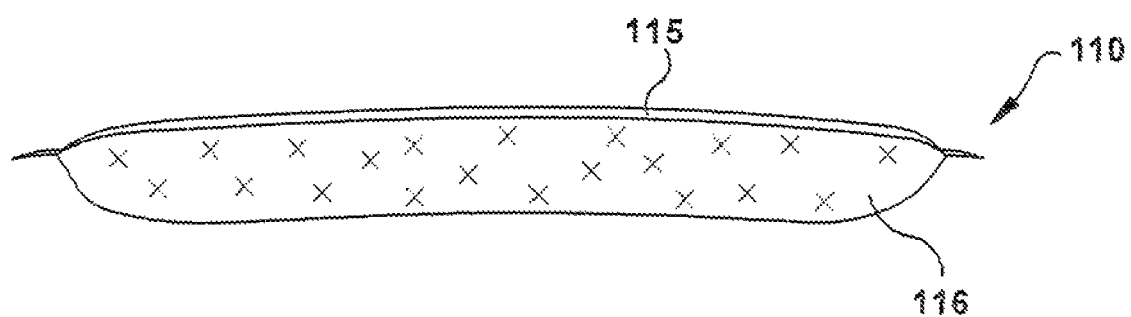
FIG. 2B is a schematic cross-sectional view of FIG. 1B along line X-X.

In contrast to the loosely-packed pods and cartridges currently on the market, exemplary articles herein may comprise a pseudo packed bed of extractable beverage material (16 in FIG. 2A and 116 in FIG. 2B). As defined herein, "pseudo packed bed" or "pseudo packed bed environment" means the extractable beverage material may be substantially fixed prior to contact with a liquid extraction stream, such that the extractable beverage material is significantly restricted in movement in all directions within the article. The size and/or area of the pseudo packed bed can be defined by the dimensions of the article in which it is contained. The pseudo packed bed can be designed such that, in one embodiment, there is substantially no void or headspace between the extractable beverage material and the article closure. In another embodiment, there may be a minimal void between the extractable beverage material and the article closure. For example, in one embodiment, the void (15 in FIG. 2A and 115 in FIG. 2B) may account for less than about 10% of the area of the article, while in another embodiment, the void may account for less than about 5%, and in still another embodiment less than about 2%, and in yet another embodiment less than about 1%, and in still another embodiment less than about 0.5%, and in yet another embodiment less than about 0.1%, of the area of the article. Additionally, the extractable beverage material may be fashioned into a pseudo packed bed as the article is assembled or the pseudo packed bed may result from the compression of the extractable material once the article is placed into a brewing device.

For example, roasted and ground coffee can comprise a range of particle sizes with each particle having its own unique morphology that can provide a degree of randomness to the pseudo packed bed environment. The individual particles' ability to pack, as well as the interspaces between the particles, can allow a pseudo-packed bed to be easily created by filling the article to substantial completeness (to fill most of the volume of an article with extractable material) i.e. in one embodiment from about 65% to about 99%, in another embodiment from about 80% to about 97%, and in yet another embodiment from about 85% to about 95% of the area of the article. Particle to particle interactions of a substantially filled article can restrict particle movement, especially in zones of minimum extraction, discussed later herein, where there is low velocity fluid movement. Thus, a pseudo packed bed environment can prevent the particles of the extractable beverage material from moving freely about, thereby providing consistency in beverage strength and flavor. Without being limited by theory, it is believed that the substantially static zones of minimum extraction may be slower to extract due to achieving a state of near-equilibrium with the mobile phase (water), as compared to the more turbulent and dynamic mobile phase present within zones of maximum extraction. It will be understood by those skilled in the art that the pseudo packed bed environment may change as the brewing cycle progresses since under dynamic extraction conditions other physical parameters may become influential (e.g. swelling of the extractable material, elongation of the filter media due to temperature and pressure, etc.) such that by the end of the brew cycle there may be some limited degree of movement of the particles of the extractable beverage material.

Figure 3:
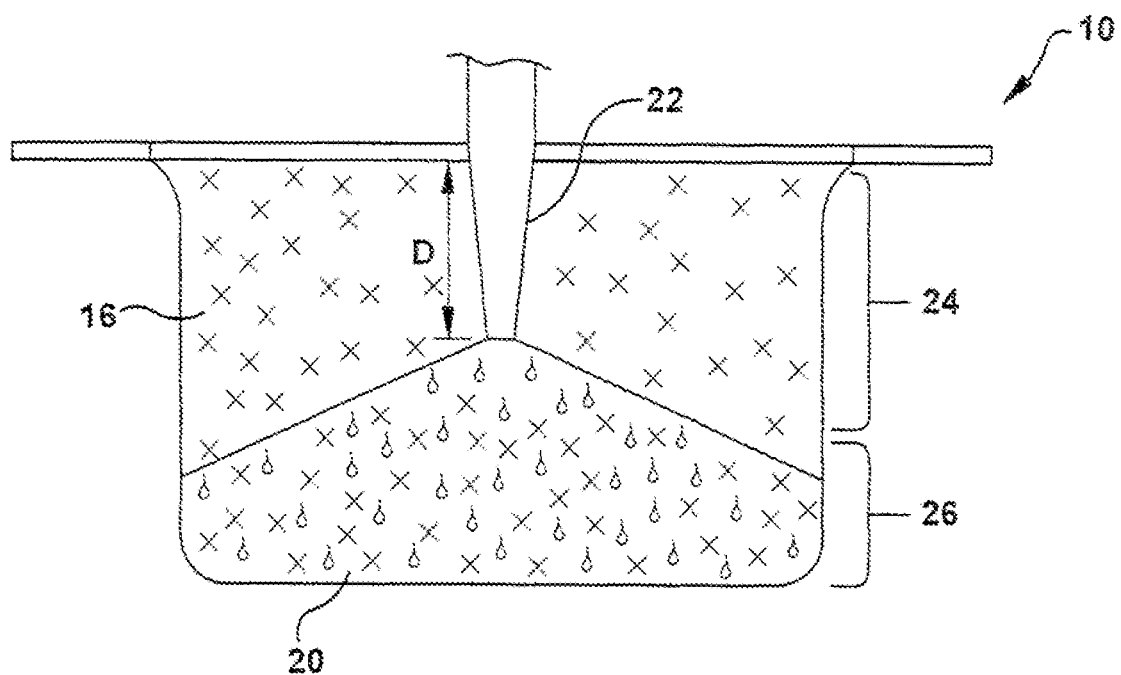
FIG. 3 is a schematic cross-sectional view of one embodiment of an article having a liquid extraction stream oriented to an average strength depth in accordance with exemplary embodiments of the present invention.

As illustrated in FIG. 3, once the pseudo packed bed of extractable beverage material 16 is obtained, at least one liquid extraction stream 20 can be brought into contact with pseudo packed bed 16. As used herein, the term "contact" means that the liquid extraction stream is in fluid communication with the pseudo packed bed of extractable beverage materials such that extraction of the beverage materials begins. Such contact can be direct or indirect. While in one embodiment, liquid extraction stream 20 can comprise water, it should not be limited to such. Moreover, liquid extraction stream 20 may be brought into contact with article 10 by way of a nozzle 22, showerhead, or other like assembly, which can be part of a beverage brewing device. Those skilled in the art will understand how to use various conventional brewing device liquid delivery mechanisms in conjunction with the processes described herein. In one embodiment, the nozzle or showerhead may spray the liquid extraction stream through at least one orifice and onto the closure of the article, thereby resulting in indirect contact with the pseudo packed bed of extractable beverage material. In this instance, it may be desired to position the nozzle or showerhead adjacent to, and in contact with, the closure of the article to minimize splashback and/or run-off of the liquid extraction stream. In another embodiment, and as shown in FIG. 3, nozzle 22 may puncture, pierce or be otherwise capable of entering article 10, and more specifically, the pseudo packed bed of extractable beverage materials 16 such that liquid extraction stream 20 can directly contact the pseudo packed bed of extractable beverage materials 16 via at least one orifice in nozzle 22. As will be explained later herein, liquid extraction stream 20 may take any of a variety of forms including, but not limited to, a spray, a fan or jet. Substantially all of water used to prepare the beverage may be directed into and through the pod for use in extracting the beverage materials therein (i.e., none of the water used to extract the beverage materials intentionally bypasses the article). This can help ensure that the beverage materials are fully extracted to provide a balanced beverage. Those skilled in the art will understand that both the velocity at which the liquid extraction stream exits nozzle or showerhead, as well as the shape of any orifices present in the nozzle or showerhead, can have an effect on the form of the liquid extraction stream. For example, to help maintain the desired zones of minimum and maximum extraction, in one embodiment, the flow rate at which the liquid extraction stream enters and extracted beverage exits the article may be about the same. Temperature of the liquid extraction stream may also affect the extractability of the beverage material and thus, the quality of the extracted beverage. While the temperature of the liquid extraction stream may vary from one brewing device to another, the expectation is that the extracted beverage will have a temperature and quality acceptable to consumers.

Upon introduction of the liquid extraction stream 20 into pseudo packed bed 16, liquid extraction stream 20 can provide at least one zone of minimum extraction 24 and at least one zone of maximum extraction 26. As used presently, "zone of maximum extraction" refers to an area of the pseudo packed bed of extractable materials wherein the extractable beverage materials may be fully extracted by constant contact with the at least one liquid extraction stream throughout the brew cycle. As explained herein below, the size and number of zones of maximum extraction can help determine the yield of soluble solids from the extractable material.

"Zone of minimum extraction" refers to an area of the pseudo packed bed in which the extractable beverage material therein is substantially unextracted. Zones of minimum extraction are generally further from the liquid extraction stream and more static than the zones of maximum extraction. Therefore, zones of minimum extraction are generally not in constant contact with a liquid extraction stream throughout the brew cycle and, therefore, do not significantly contribute to the overall strength of the extracted beverage.

The size of the zones of maximum extraction and minimum extraction can vary depending on the desired beverage strength. For instance, a "strong" beverage as defined herein can comprise from about 0.76% to about 0.95% brew solids and in one embodiment at least about 0.80% brew solids, and in yet another embodiment at least about 0.85%, brew solids, by weight of the extracted beverage. An "average" beverage as defined herein can comprise from about 0.50% to about 0.75% brew solids, and in one embodiment about 0.60% brew solids, by weight of the extracted beverage. A "mild" beverage as defined herein can comprise less than about 0.50% brew solids, and in one embodiment from about 0.35% to about 0.49% brew solids, and in yet another embodiment about 0.40% brew solids, by weight of the extracted beverage. Brew solids content may be determined using any conventional technique known to those skilled in the art.

In general, the zone of maximum extraction may account for from about 0.01% to about 99.99% of the pseudo packed bed. If a strong beverage is desired, the zone of maximum extraction may account for from about 84% to about 99.9%, and in another embodiment from about 91.8% to about 99.7%, of the pseudo packed bed. If an average beverage is desired, the zone of maximum extraction may account for from about 53% to about 83%, and in another embodiment from about 62% to about 73%, of the pseudo packed bed. If a mild beverage is desired, the zone of maximum extraction may account for from about 30% to about 52%, and in another embodiment from about 39% to about 50%, of the pseudo packed bed.

Similarly, the zone of minimum extraction may account for from about 0.01% to about 99.9% of the pseudo packed bed. If a strong beverage is desired, the zone of minimum extraction may account for from about 0.01% to about 16%, and in another embodiment from about 0.03% to about 8.2%, of the pseudo packed bed. If an average beverage is desired, the zone of minimum extraction may account for from about 17% to about 47%, and in another embodiment from about 27% to about 38%, of the pseudo packed bed. If a mild beverage is desired, the zone of minimum extraction may account for from about 48% to about 70%, and in another embodiment from about 50% to about 61%, of the pseudo packed bed.

In view of the above, it can be said that the ratio of the zone of minimum extraction to the zone of maximum extraction may be from about 0.19:1 to about 0.01:1, and in one embodiment about 0.05:1, for a strong beverage, from about 0.2:1 to about 0.89:1, and in one embodiment about 0.5:1 for an average beverage and from about 0.90 to about 2.3:1, and in one embodiment about 1.2:1 for a mild beverage.

It will be understood by those skilled in the art that the foregoing "strong," "average" and "mild" strengths are based on US consumers' taste preferences, and thus, in other regions of the world the defined values of the foregoing characteristics may differ from those set forth herein. It will also be understood by those skilled in the art that, in general, the greater the zone of maximum extraction, the smaller the zone of minimum extraction, and the stronger the extracted beverage. Conversely, the greater the zone of minimum extraction, the smaller the zone of maximum extraction, the milder the extracted beverage.

Within each zone of maximum extraction, the coffee can be fully extracted and balanced. As used herein, "fully extracted" means that substantially all of the water soluble solids in the extractable beverage material within the targeted zone of maximum extraction can be solubilized and removed from the remaining mass of insoluble matter, when subjected to typical brewing temperatures. "Balanced" means that the flavor of the extracted beverage is of a high-quality typical of a fully-extracted coffee. The fraction eluted during the first half of an extract from a given portion of coffee tends to comprise sweet compounds. By itself, this initial fraction produces an unbalanced cup of coffee. In contrast, the fraction eluted during the final half of an extraction tends to comprise compounds that are bitter. Again, alone, this final fraction produces an unbalanced cup of coffee. However, when these fractions are combined, the sweet and bitter compounds blend together to produce a balanced cup of coffee. Thus, the flavor of a "balanced" beverage generally comprises about equal amounts of both the early and late eluting components and does not contain substantially more of one component than the other. A surprising aspect of the present invention is that a reduced strength beverage having a balanced flavor, can consistently be prepared from an article that is capable of providing more strength or brew solids, simply by altering the ratio of the zones of minimum and maximum extraction within the pseudo-packed bed. Conventional coffee brewing processes generally cannot achieve a reduced strength beverage having a balanced flavor without reducing the amount of coffee used; as shifting of the loosely packed coffee particles during the brew cycle tends to result in a substantially even extraction of all of the beverage materials. Attempts to use less water by bypassing at least a portion of the water around the pod can produce a lower strength beverage but such a beverage may likely have an unbalanced flavor, or watered down taste, since the coffee is not fully extracted.

Though embodiments of the present processes may be applied in a variety of ways, as described in detail herein below, regardless of the application, the processes can remedy the foregoing known extraction difficulties of prepackaged articles and provide a fully extracted, balanced coffee beverage having the strength desired by the consumer. This is made possible by the use of the pseudo packed bed environment, which, as previously described, can restrict movement and shifting of the coffee particles and help ensure that the targeted zone of maximum extraction remains substantially fixed throughout the brew cycle.

One exemplary embodiment of the present processes comprises providing a pseudo packed bed of an extractable beverage material; contacting at least one liquid extraction stream with the pseudo packed bed of beverage material at a selected depth to obtain at least one zone of minimum extraction and at least one zone of maximum extraction, wherein as the depth at which the liquid extraction stream contacts the packed bed increases, the zone of minimum extraction increases and the zone of maximum extraction decreases.

In the foregoing embodiment, it is the depth at which the liquid extraction stream contacts the pseudo packed bed of beverage material that dictates the strength of the extracted beverage. As used herein, and as illustrated in FIG. 3, "depth" D of liquid extraction stream 20 refers to the distance into the pseudo packed bed 16 at which the liquid extraction stream contacts the pseudo packed bed of extractable beverage material 16. In one embodiment, and as shown in FIG. 3, liquid extraction stream 20 may be introduced into article 10, and contact pseudo packed bed 16, via nozzle 22. In this particular embodiment, nozzle 22 can have a piercing member having one or more orifices through which to distribute liquid extraction stream 20 throughout pseudo packed bed 16, thereby creating zone of minimum extraction 24 and zone of maximum extraction 26. It is intended that the consumer can control the depth of the liquid extraction stream by any conventional brewing device control mechanism known to those skilled in the art, such as, for example, a dial or button selector or lever that allows the consumer to select the depth of the liquid extraction stream, and therefore, the strength, of the beverage desired.

Manipulating depth D of liquid extraction stream 20 can alter the strength of the extracted beverage because different depths can correlate to different sized zones of maximum and minimum extraction. For instance, introducing liquid extraction stream 20 about one third the way into pseudo packed bed 16, as shown in FIG. 3, can provide an average strength beverage because the ratio of minimum to maximum zones of extraction would be about 0.5:1 thus leading to the-aforementioned brew solids content of from about 0.50% to about 0.75%. Therefore, because about 67% of the extractable beverage material contained within article 10 is fully extracted, the beverage strength is about average.

Figure 4:
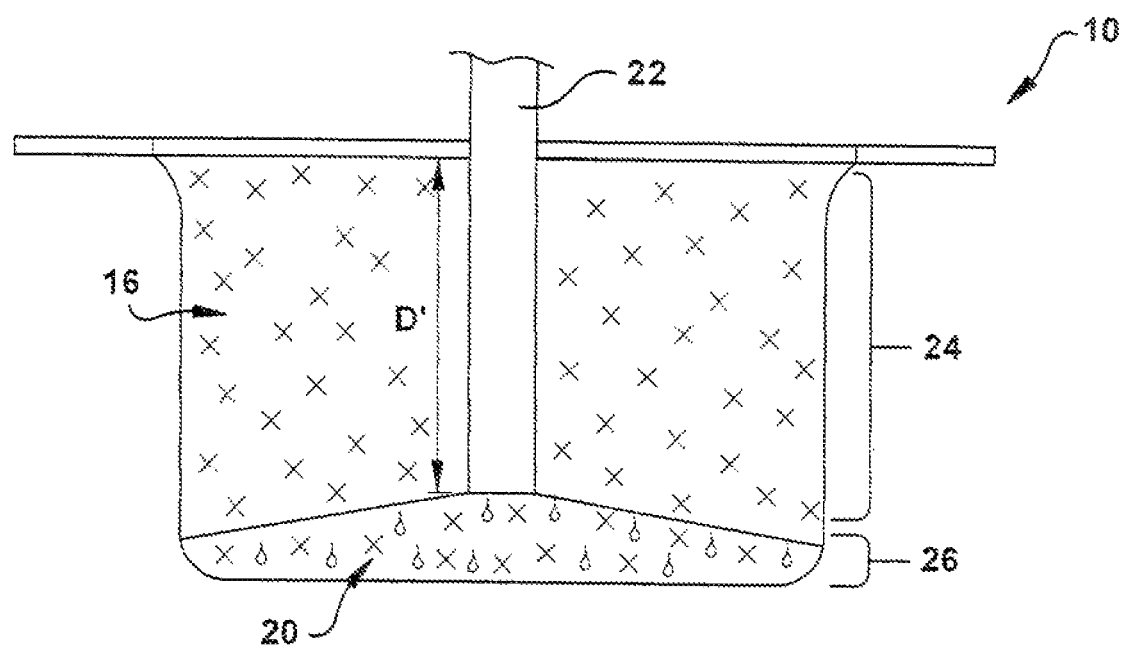
FIG. 4 is a schematic cross-sectional view of one embodiment of an article having a liquid extraction stream oriented to a mild strength depth in accordance with exemplary embodiments of the present invention.

Similarly, the depth of the liquid extraction stream may also be controlled to produce a mild or strong beverage by altering the placement of the liquid extraction streams. More specifically, as shown in FIG. 4, a mild beverage may be obtained by positioning liquid extraction stream 20 to a substantial depth D' within pseudo packed bed 16, which results in a small zone of maximum extraction 26 and a large zone of minimum extraction 24. Because a lesser percentage of the extractable beverage materials are fully extracted, the resulting beverage is mild. Conversely, a strong beverage may be obtained by positioning the liquid extraction stream to a shallow depth within the pseudo packed bed, which can result in a large zone of maximum extraction and a small zone of minimum extraction. Because a greater percentage of the extractable beverage materials are fully extracted, the resulting beverage is strong.

In a second exemplary embodiment of the present invention, the present processes can comprise providing a pseudo packed bed of an extractable beverage material, contacting at least one liquid extraction stream having a selected coverage area with the pseudo packed bed of beverage material to obtain at least one zone of minimum extraction and at least one zone of maximum extraction, wherein as the coverage area of the liquid extraction stream increases, the zone of minimum extraction decreases and the zone of maximum extraction increases.

Figure 5:
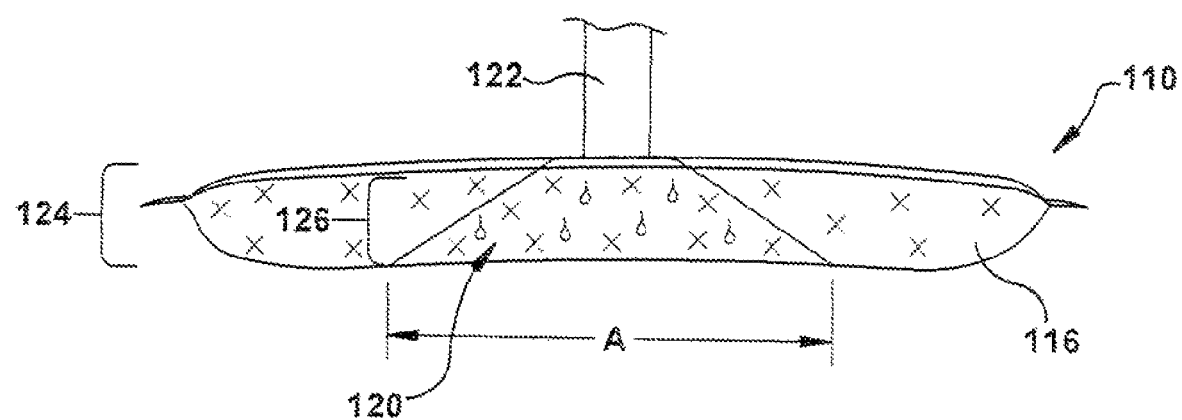
FIG. 5 is a schematic cross-sectional view of one embodiment of an article having a liquid extraction stream oriented to an average strength coverage area in accordance with exemplary embodiments of the present invention.

In this second exemplary embodiment, and as illustrated in FIG. 5, it is the coverage area A of liquid extraction stream 120 when it contacts pseudo packed bed of extractable beverage material 116 that can dictate the strength of the extracted beverage. As used herein, the "coverage area" means the portion of the pseudo packed bed of extractable material within the article that can be contacted by the at least one liquid extraction stream. As previously mentioned, the liquid extraction stream may take any variety of forms, including, but not limited to, a spray, a fan or a jet. Similar to depth, coverage area of the liquid extraction stream may be controlled by the consumer by way of any conventional brewing device control mechanism known to those skilled in the art, such as, for example, a dial or button selector or lever that allows the consumer to select the coverage area of the liquid extraction stream, and therefore, the strength, of the beverage desired. In one exemplary embodiment, coverage area may be altered by manipulating the velocity at which the liquid extraction stream exits the nozzle or showerhead. In another exemplary embodiment, coverage area may be altered by manipulating the size of the orifices present in the nozzle or showerhead.

Controlling the coverage area of the liquid extraction stream can alter the strength of the beverage because different coverage areas can correlate to different sized zones of maximum and minimum extraction. For instance, liquid extraction stream 120, having a coverage area A in the form of a fan, as shown in FIG. 5, could be used to provide an average strength beverage because the ratio of the zone of minimum extraction 124 to the zone of maximum extraction 126 would be about 0.5:1, thus leading to a brew solids content of about 0.50% to about 0.75%.

Figure 6:
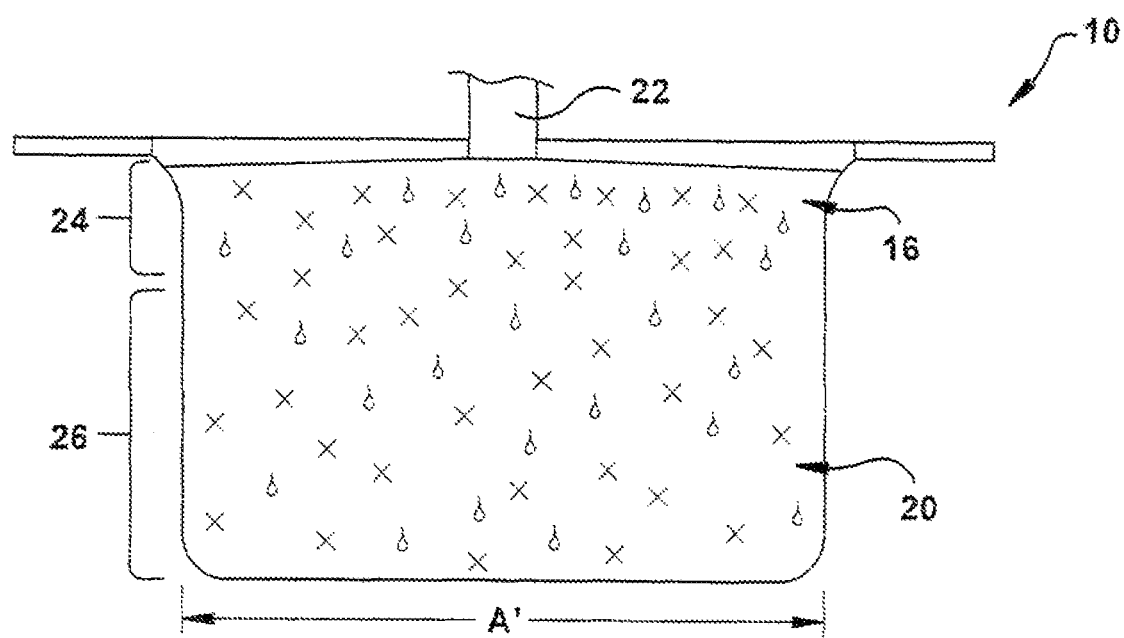
FIG. 6 is a schematic cross-sectional view of one embodiment of an article having a liquid extraction stream oriented to a strong strength coverage area in accordance with exemplary embodiments of the present invention.

Similarly, the coverage area of the liquid extraction stream may be controlled to produce a mild or strong beverage by adjusting the size of the coverage area of the liquid extraction stream. More specifically, a mild beverage may be selected by introducing a liquid extraction stream having a coverage area in the form of a narrow jet, which results in a small zone of maximum extraction and a large zone of minimum extraction. Because a lesser percentage of the extractable beverage materials are fully extracted, the resulting beverage is mild. Conversely, as shown in FIG. 6, a strong beverage may be selected by contacting a liquid extraction stream 20 having a coverage area A' in the form of a broad spray, with the pseudo packed bed 16. This can result in a large zone of maximum extraction 26 and a small zone of minimum extraction 24. Because a greater percentage of the extractable beverage materials are fully extracted, the resulting beverage is strong.

Figure 7:
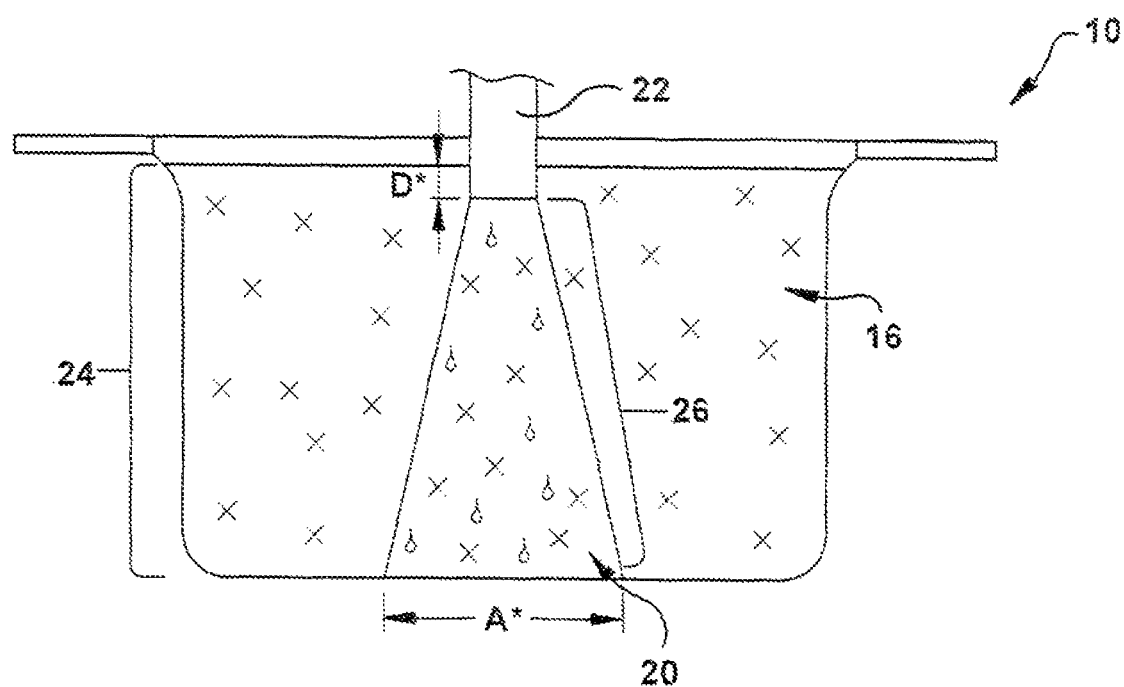
FIG. 7 is a schematic cross-sectional view of one embodiment of an article having a liquid extraction stream oriented to a mild strength depth and coverage area in accordance with exemplary embodiments of the present invention.

A third exemplary embodiment of the present invention is illustrated in FIG. 7 and generally relates to processes that combine the two previously described embodiments. In this particular embodiment, the processes comprise providing a pseudo packed bed of an extractable beverage material, and contacting at least one liquid extraction stream having a selected coverage area with the pseudo packed bed at a selected depth to obtain at least one zone of minimum extraction and at least one zone of maximum extraction, wherein as the coverage area of the liquid extraction stream increases, the zone of minimum extraction decreases and the zone of maximum extraction increases and wherein as the depth at which the liquid extraction stream contacts the pseudo packed bed increases, the zone of minimum extraction increases and the zone of maximum extraction decreases.

Figure 8:
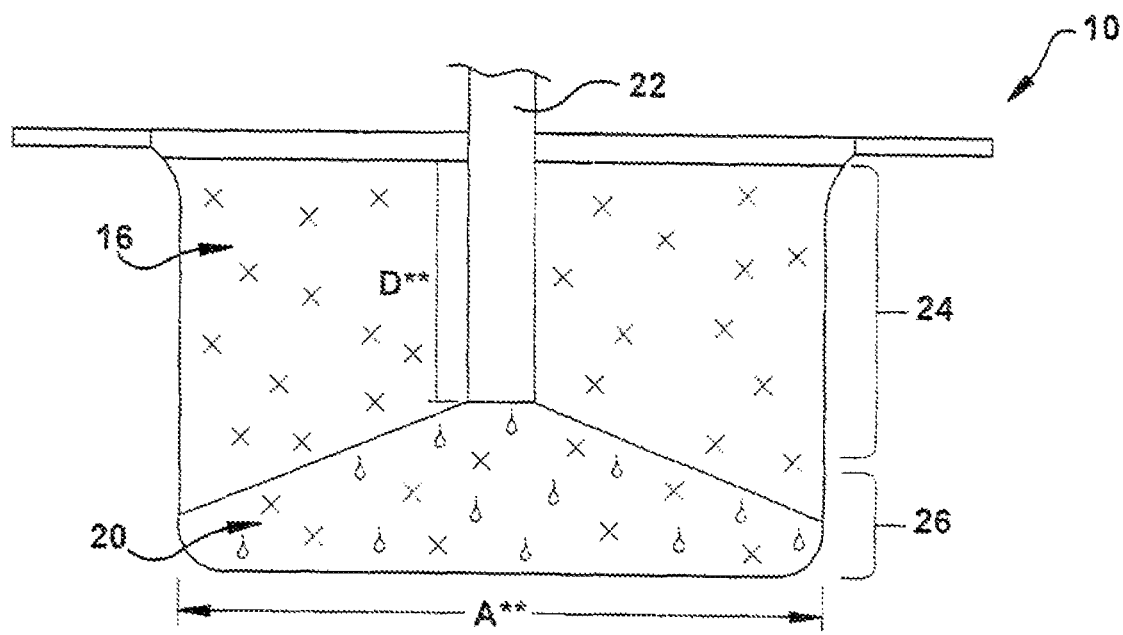
FIG. 8 is a schematic cross-sectional view of an alternate embodiment of an article having a liquid extraction stream oriented to a mild strength depth and coverage area in accordance with exemplary embodiments of the present invention.

In this third exemplary embodiment, it is both the depth at which the liquid extraction stream contacts the pseudo packed bed, as well as coverage area of the liquid extraction stream when it contacts the pseudo packed bed, which can dictate the strength of the extracted beverage. For instance, as shown in FIGS. 7 and 8, a mild strength beverage can he produced in at least two different ways. FIG. 7 illustrates liquid extraction stream 20 in the form of a jet having a narrow coverage area A* contacting pseudo packed bed 16 at a shallow depth D*. This can provide a ratio of the zone of minimum extraction 24 to the zone of maximum extraction 26 of about 1.2:1. Likewise, as illustrated in FIG. 8, a liquid extraction stream 20 in the form of a jet having a broad coverage area A may contact pseudo packed bed 16 at a substantial Depth D, or about two-thirds of the way, into pseudo packed bed 16 to also provide a ratio of the zone of minimum extraction 24 to the zone of maximum extraction 26 of about 1.2:1. As shown in FIGS. 7 and 8, different depths and coverage areas may be combined in numerous ways to produce a mild strength extracted beverage. Those skilled in the art will understand how the depth and coverage area of the liquid extraction stream may be manipulated to provide beverages having different strengths.

Figure 9:
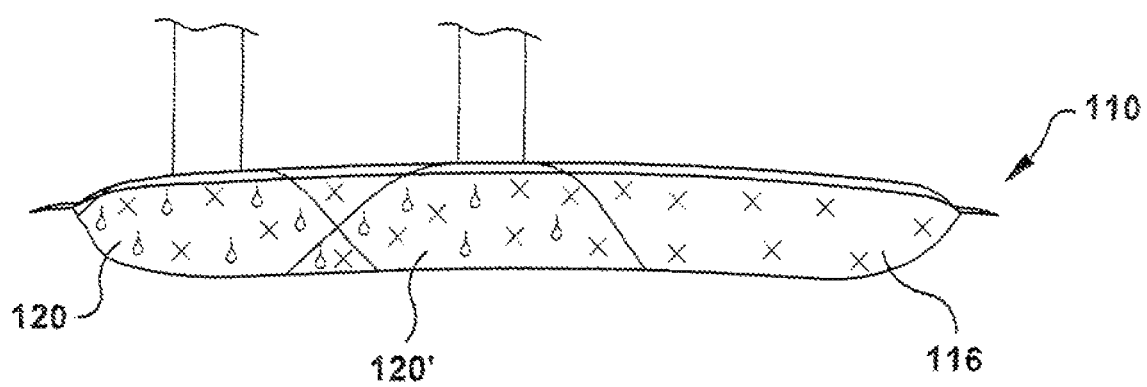
FIG. 9 is a schematic cross-sectional view of one embodiment of an article having multiple liquid extraction streams in accordance with exemplary embodiments of the present invention.

Additionally, it should be noted that for any embodiment of the present invention, including those described above, there should be at least one liquid extraction stream, but the present process need not be limited to only one liquid extraction stream. There may be any number of liquid extraction streams, such as two, three or four. As a result, there may also be any number of zones of maximum extraction, as well as any number of zones of minimum extraction, though, in one embodiment, there is at least one of each. To reflect this notion, and as defined herein, the term "at least one," as used in references to the liquid extraction stream and/or the zones of extraction, encompasses two, three, four or any number of liquid extraction streams and/or zones of extraction unless specifically designated otherwise. For example, as shown in FIG. 9, article 110 may be contacted by two liquid extraction streams, 120 and 120', to increase the area of pseudo packed bed 116 that can be fully extracted, thereby increasing the overall strength of the extracted beverage.

As will be understood by those skilled in the art, regardless of the particular embodiment employed, as the number of liquid extraction streams increases, the overall strength of the extracted beverage increases. This is because as the number of liquid extraction streams increases, the number, and therefore the collective size, of the zones of maximum extraction also increases. Moreover, it should be noted that in situations where there is more than one liquid extraction stream present, the multiple streams need not be identical. Each liquid extraction stream may be positioned to the same or differing depths and have the same of differing coverage areas. More particularly, one extraction stream may be a jet injected halfway into the pseudo packed bed while a second stream is in the form of a broad sprayed introduced at a shallow depth into the pseudo packed bed. Each zone of maximum extraction will occupy a different area of the pseudo packed bed, though such areas may overlap, but the overall strength of the extracted beverage will be stronger than it would have been with each of the zones of maximum extraction individually.

EXAMPLES

Example 1

A coffee pod is prepared for use in a single cup brewing device. The single-use pod resembles a thin-walled plastic cup and has an internal capacity of about 26.5 cc and a depth of about 1.25 inches (3.2 cm), as measured from the bottom of the pod to where a closure will be attached. The cup is filled substantially to capacity with about 9.5 grams of roast & ground coffee having a mean particle size distribution of about 400 microns, thereby creating a substantially packed bed of extractable beverage material (i.e. coffee). A nonwoven polymeric filter paper (JR Crompton LTD.) is heat sealed to the cup as a closure, thus containing the coffee grounds. A consumer inverts the pod and places it into a brewing device manufactured to brew the pod at either a strong, average, or mild brew strength. The water reservoir of the brewing device is filled with the necessary amount of water and a cup is positioned to receive the extracted coffee. The consumer, desiring a beverage having a "strong" strength, selects a strong beverage by turning a dial on the brewing device to a preset "strong" position and pressing the start button. The brew cycle is initiated and the brewing device pushes an approximately 3/32 inch (2.38 mm) I.D. tubular shaped nozzle having a 20° acute angle into what is now the top of the pod. The nozzle enters the pseudo packed bed of extractable beverage material at a depth of about 0.187 inches (4.75 mm). Hot water passes through the nozzle at a rate of about 5.0 cc/second at a temperature of about 185° F. (85 C.) for about 55 seconds. About 266 grams of extracted coffee is collected into the consumer's cup. The extracted coffee has a strong strength and balanced flavor and is determined to contain about 0.85% brew solids.

Example 2

A coffee pod is prepared and placed into a brewing device as in Example 1 above. The consumer, desiring a beverage having an average strength, selects an "average" beverage by turning a dial on the brewing device to a preset "average" position and pressing the start button. The brew cycle is initiated and the brewing device pushes an approximately 3/32 inch (2.38 mm) I.D. tubular shaped nozzle having a 20° acute angle into what is now the top of the pod. The nozzle enters the pseudo packed bed of extractable beverage material at a depth of about 0.50 inches (12.7 mm) as measured from the center of the orifices to the pod closure. Hot water at a temperature of about 185° F. (85 C.) passes through the nozzle for about 55 seconds, at a rate of about 5.0 cc/second produces a velocity of about 112 cm/second. About 266 grams of extracted coffee is collected into the consumer's cup. The extracted coffee has an average strength and balanced flavor and is determined to contain about 0.60% brew solids.

Example 3

A coffee pod is prepared and placed into a brewing device as in Example 1 above. The consumer, desiring a beverage having a "mild" strength, selects a mild beverage by turning a dial on the brewing device to a preset "mild" position and pressing the start button. The brew cycle is initiated and the brewing device pushes an approximately 3/32 inch (2.38 mm) I.D. tubular shaped nozzle having a 20° acute angle into what is now the top of the pod. The nozzle enters the substantially packed bed of extractable beverage material at a depth of about 0.50 inches (12.7 mm). Hot water at a temperature of about 185° F. (85 C.) passes through the nozzle for about 41 seconds, at a rate of about 6.5 cc/second produces a velocity of about 146 cm/second. About 266 grams of extracted coffee is collected into the consumer's cup. The extracted coffee has a mild strength and balanced flavor and is determined to contain about 0.45% brew solids.

Example 4

A coffee pod is prepared and placed into a brewing device as in Example 1 above. The consumer, desiring a beverage having an "average" strength, selects an average beverage by pressing a preset "average" button on the brewing device followed by pressing the start button. The brew cycle is initiated and the brewing device pushes into what is now the top of the pod an approximately 1/16 in (1.59 mm) I.D. tubular shaped nozzle into the pod as opposed to its 3/32 inch (2.38 mm) I.D. tubular shaped nozzle having a 20° acute angle which produces a broad coverage area. The nozzle enters the substantially packed bed of extractable beverage material at a depth of about 0.10 inches (2.54 mm). Hot water passes through the nozzle at a rate of about 5.0 cc/second at a temperature of about 185° F. (85 C.) for about 55 seconds. About 266 grams of extracted coffee is collected into the consumer's cup. The extracted coffee has an average strength and balanced flavor and is determined to contain about 0.75% brew solids.

Example 5

A coffee pod is prepared and placed into a brewing device as in Example 1 above. The consumer, desiring a beverage having a "average" strength, selects an average beverage setting by moving a lever on the brewing device to a preset "average" position, and the start button is pressed. The brew cycle is initiated and the brewing device pushes an articulated tubular shaped nozzle capable of changing its orifice in graduations from approximately 1/16 inch (1.59 mm) I.D., to approximately 3/32 inch (2.38 mm) I.D., to approximately 1/8 inch (3175 mm) I.D., to a full opening of approximately 5/32 inch (3.97 mm) I.D. nozzle into what is now the top of the pod. At the average setting, the brewer adjusts the nozzle from the previous orifice setting, to an orifice of 1/8 inch (3.175 mm) I.D., and the nozzle enters the substantially packed bed of extractable beverage material at a depth of 0.50 inches (12.7 mm). Hot water passes through the nozzle at a rate of about 5.0 cc/second at a temperature of about 185° F. (85 C.) for about 55 seconds. About 266 grams of extracted coffee is collected into the consumer's cup. The extracted coffee has an average strength and balanced flavor and is determined to contain about 0.725% brew solids.

Example 6

A flat pod, similar to that shown in FIG. 1B, is constructed from a non-woven material. The pod has a compartment diameter of approximately 2.375 inches, a body of approximately 0.3125 inches and is filled with about 9.5 grams of roast and ground coffee having a mean particle size distribution of about 400 microns, thereby creating a pseudo packed bed of extractable beverage material (i.e. coffee). The consumer places the pod into a brewing device manufactured to brew the pod at either a strong, average, or mild brew strength. The brewing device is closed and within the brewer, a showerhead of substantially the same diameter as the pod positioned adjacent to and in contact with the closure of the pod, thereby holding it secure. Three water inlet holes are spatially located in the showerhead to provide full coverage of the pod by the water. On the other side of the showerhead is another disk having holes that selectively allow communication to the holes in the showerhead through rotation of the disk. A control knob used by the consumer to select the beverage strength is affixed to the disk. By rotation of the knob, the disk is rotated internally within the brewer which allows one, two, or all three holes in the showerhead to be used for brewing the pod to produce a mild, average, or strong strength beverage respectively. With a selection of mild, only one hole is in communication with the pod. The start button is pressed and water from the reservoir is heated by the brewer and pumped through the one hole in the showerhead and into the pod, and the extracted beverage is collected in a cup after exiting the brewer. The extracted coffee has a mild strength and balanced flavor and contains about 0.40% coffee brew solids.

All documents cited in the present specification are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention.

It is therefore intended to cover in the appended claims all such changes and modifications that are within the scope of this invention.

What is claimed is:

1. A single-serve coffee pod for use in a brewing device comprising a deep cup-shaped container and roast and ground coffee particles having a mean particle size of from about 300 microns to about 500 microns;
   wherein the container is semi-rigid yet flexible and comprises a water impermeable body, a closure constructed of foils, plastics, or combinations thereof sealed to the body and a water permeable bottom attached to the body;
   wherein the container is sufficiently filled with the roast and ground coffee particles such that there is minimal headspace between the roast and ground coffee particles and the closure sealed to the body;
   wherein the container is sufficiently flexible and the headspace is minimal enough to allow the roast and ground coffee particles to be compressed into a pseudo packed bed of roast and ground coffee particles once the pod is placed in the brewing device;
   wherein the closure upon being pierced by a nozzle assembly of the brewing device enables a liquid extraction stream to contact the pseudo-packed bed of roast and ground coffee particles, thereby producing an extracted beverage;
   wherein the bottom enables exiting of the extracted beverage from the container, thereby ensuring proper extraction of the extracted beverage; and
   wherein the container retains and prevents the roast and ground coffee particles from exiting the container with the extracted beverage.

2. The single-serve coffee pod according to claim 1, wherein the single-serve coffee pod further comprises water soluble solids and insoluble material, which may be left in the pod under typical brewing conditions.

3. The single-serve coffee pod according to claim 2, wherein the roast and ground coffee particles have a article size of about 400 microns.

* * * * *